(12) United States Patent
Wang et al.

(10) Patent No.: US 6,798,221 B2
(45) Date of Patent: Sep. 28, 2004

(54) METHOD, APPARATUS AND ARTICLE TO TEST FUEL CELLS

(75) Inventors: Zhaoyu Wang, Vancouver (CA); Ross W. Johnston Bailey, Vancouver (CA); Graham E. Hill, Vancouver (CA); Hong The Nguyen, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 196 days.

(21) Appl. No.: 10/076,857

(22) Filed: Feb. 14, 2002

(65) Prior Publication Data

US 2003/0076110 A1 Apr. 24, 2003

Related U.S. Application Data

(63) Continuation-in-part of application No. 10/066,316, filed on Oct. 22, 2001, now abandoned.

(51) Int. Cl.[7] .................... G01R 27/08; G01R 31/08
(52) U.S. Cl. .................. 324/713; 324/512; 324/525
(58) Field of Search ................................ 324/512, 525, 324/527, 713, 719; 320/132

(56) References Cited

U.S. PATENT DOCUMENTS

| | | | | |
|---|---|---|---|---|
| 3,786,680 A | * | 1/1974 | Wyatt et al. .............. 73/861.12 |
| 4,198,597 A | | 4/1980 | Sawyer ........................ 324/434 |
| 4,376,485 A | * | 3/1983 | Shah .......................... 209/575 |
| 4,424,491 A | | 1/1984 | Bobbett et al. ............. 324/433 |
| 5,170,124 A | | 12/1992 | Blair et al. .................. 324/434 |
| 5,262,034 A | | 11/1993 | Kunz et al. .................. 204/401 |
| 5,945,805 A | | 8/1999 | Takei et al. .................. 320/124 |
| 6,011,379 A | | 1/2000 | Singh et al. ................. 320/132 |
| 6,140,820 A | | 10/2000 | James .......................... 324/434 |
| 6,160,382 A | | 12/2000 | Yoon et al. .................. 320/136 |
| 6,531,876 B1 | * | 3/2003 | Einhart et al. .............. 324/434 |

FOREIGN PATENT DOCUMENTS

| | | |
|---|---|---|
| DE | 4338178 A1 | 5/1995 |
| EP | 0918363 A1 | 5/1999 |
| EP | 1069636 A2 | 1/2001 |
| JP | 63-117277 | 5/1988 |
| JP | 2000-028689 | 1/2000 |
| WO | WO 99/67654 | 12/1999 |

* cited by examiner

*Primary Examiner*—N. Le
*Assistant Examiner*—John Teresinski
(74) *Attorney, Agent, or Firm*—Seed IP Law Group PLLC

(57) ABSTRACT

A fuel cell resistance test system includes a contact head having a plurality of spaced electrical contacts for contacting multiple ones of the fuel cells composing the stack. In one embodiment, a plurality of selectively actuable switches produce a short between respective pairs of adjacent ones of the electrical contacts. A processor opens each of the switches, one at a time in succession, to apply a defined voltage from a voltage source, successively across pairs of adjacent ones of the electrical contacts. A current sensor measures a resulting current and the processor or other computer determines whether a short exists based on the magnitude of the defined voltage and the magnitude of the resulting current. Alternatively, the test system may include a current source and a voltage sensor.

40 Claims, 11 Drawing Sheets

METHOD, APPARATUS AND ARTICLE TO TEST FUEL CELLS

CROSS-REFERENCE TO RELATED APPLICATION

This application is a continuation-in-part of the U.S. patent application No. 10/066,316 filed Oct. 22, 2001, using Express Mail No. EL897855979US, and entitled "METHOD, APPARATUS AND ARTICLE TO TEST FUEL CELLS" No. 130109.423), now abandoned.

BACKGROUND OF THE INVENTION

1. Technical Field

The present invention generally relates to fuel cell stacks, and particularly to methods, apparatus and articles for testing fuel cells and fuel cell stacks prior to operation.

2. Description of the Related Art

Electrochemical fuel cells convert fuel and oxidant to electricity. Solid polymer electrochemical fuel cells generally employ a membrane electrode assembly ("MEA") which includes an ion exchange membrane or solid polymer electrolyte disposed between two electrodes typically comprising a layer of porous, electrically conductive sheet material, such as carbon fiber paper or carbon cloth. The MEA includes a layer of catalyst, typically in the form of finely comminuted platinum, at each membrane/electrode interface to induce the desired electrochemical reaction. In operation the electrodes are electrically coupled to provide a circuit for conducting electrons between the electrodes through an external circuit. Typically, a number of MEAs are serially coupled electrically to form a fuel cell stack having a desired power output.

In typical fuel cells, the MEA is disposed between two electrically conductive fluid flow field plates or separator plates. Fluid flow field plates have at least one flow passage formed in at least one of the major planar surfaces thereof. The flow passages direct the fuel and oxidant to the respective electrodes, namely, the anode on the fuel side and the cathode on the oxidant side. The fluid flow field plates act as current collectors, provide support for the electrodes, provide access channels for the fuel and oxidant, and provide channels for the removal of reaction products, such as water, formed during operation of the cell.

Defects in the ion exchange membrane, such as stray carbon fibers extending from the membrane, can create an electrical short or a potential for an electrical short across the MEA. To detect shorts or the potential for shorting, manufacturers perform stack resistance testing before completing manufacture or shipping to distributors or customers. Manufacturers typically test each fuel cell in each stack, one fuel cell at a time. The stack resistance testing is performed on non-operating stacks, in contrast to other testing or monitoring performed during stack operation. For example laid open, Japanese patent application JP63-117277 teaches applying a direct current to one of the electrodes of a fuel cell and measuring a corresponding potential generated between the two electrodes of the fuel cell. The level and pattern of the voltage response is compared to a level and pattern of voltage response for a "normally" operating fuel cell.

Existing testing techniques are labor and time intensive. For example, in existing tests a probe is manually repositioned to successively contact each of the fuel cells in the stack. Testing currently takes approximately 45 seconds per fuel cell, and up to 30 minutes to test a stack of 47 fuel cells. Existing testing methods and apparatus result in lower production output and higher costs. Consequently, there is a need for improved methods and apparatus for automated, nondestructive testing of fuel cells and/or fuel cell stacks, particularly for reducing the cycle time required to test fuel cell stacks during manufacturing.

BRIEF SUMMARY OF THE INVENTION

Applicants have recognized that some of the time currently required for testing is attributable to the relatively long delay between applying an input voltage or current and the fuel cell reaching a steady state condition when a resulting output current or voltage is measured, the delay resulting from the inherent capacitive effect of the MEA structure. Applicants have also recognized that some of the time currently required for testing is attributable to the manual repositioning of the probe. Applicants have further recognized that some of the time currently required for testing is attributable to limits on the amount of current or voltage that can be applied to the fuel cell without causing damage to the MEA, for example damage caused by oxidation of the carbon in the electrodes or of catalyst components, including ruthenium (where present) and the carbon of carbon-supported catalysts.

According to one aspect of the invention, a fuel cell resistance test system includes a voltage source selectively operable to produce a defined voltage; a contact head having at least three electrical contacts; means for applying the defined voltage produced by the voltage source successively across pairs of adjacent ones of the electrical contacts; a current sensor coupled to the electrical contacts to measure a resulting supply current; and a processor coupled to receive signals corresponding to at least one of the magnitude of the defined voltage and the magnitude the resulting current, where the processor is configured to determine whether a short exists based on the magnitude of the defined voltage and the magnitude of the resulting current.

According to another aspect of the invention, a fuel cell resistance test system includes a contact head having a plurality of spaced electrical contacts; a plurality of switches, each of the switches selectively actuable to produce a short between a respective pair of adjacent ones of the electrical contacts; a voltage source selectively operable to produce a defined voltage; a processor coupled to open each of the switches, one at a time in succession, to apply the defined voltage from the voltage source successively across pairs of adjacent ones of the electrical contacts; and at least one current sensor coupled to the electrical contacts to measure a resulting current; where the processor is coupled to receive signals corresponding to the magnitude of the defined voltage and the magnitude the resulting current, and configured to determine whether a short exists based on the magnitude of the defined voltage and the magnitude of the resulting current.

In another aspect, a method of testing fuel cell stacks includes simultaneously coupling a plurality of spaced electrical contacts to respective portions of a fuel cell stack; successively applying a defined voltage between each respective pair of adjacent ones of the electrical contacts; successively measuring a respective current resulting from each of the applied defined voltages; and determining whether a short exists based on the defined voltages and the resulting currents.

In a further aspect, a method of testing fuel cell stacks includes simultaneously coupling a plurality of spaced electrical contacts to respective portions of a fuel cell stack;

successively applying a defined voltage between each respective pair of adjacent ones of the electrical contacts; successively measuring a respective current resulting from each of the applied defined voltages; and determining whether a short exists based on the defined voltages and the resulting currents.

According to an alternative aspect of the invention, a fuel cell resistance test system includes a current source operable to produce a defined current; a contact head having plurality of pairs of electrical contacts; means for applying a defined current through successive ones of the pairs of electrical contacts while grounding at least some of the other pairs of electrical contacts; at least one voltage sensor to measure a resulting voltage across adjacent ones of the pairs of electrical contacts; and a processor coupled to receive signals corresponding to at least one of a magnitude of the defined current and a magnitude the resulting voltage, the processor configured to determine whether a short exists based on the magnitude of the defined current and the magnitude of the resulting voltage.

In yet a further alternative aspect, a method of testing fuel cell stacks includes simultaneously coupling a plurality of spaced pairs of electrical contacts to respective portions of a fuel cell stack; successively applying a defined current through each respective pair of the electrical contacts; measuring a respective voltage across resulting from each of the applied defined voltages across adjacent ones of the pairs of electrical contacts; and determining whether a short exists based on the defined currents and the resulting voltages.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been selected solely for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well known structures associated with fuel cells, microcontrollers, sensors, and actuators have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

Fuel Cell System Overview

Figure 1:
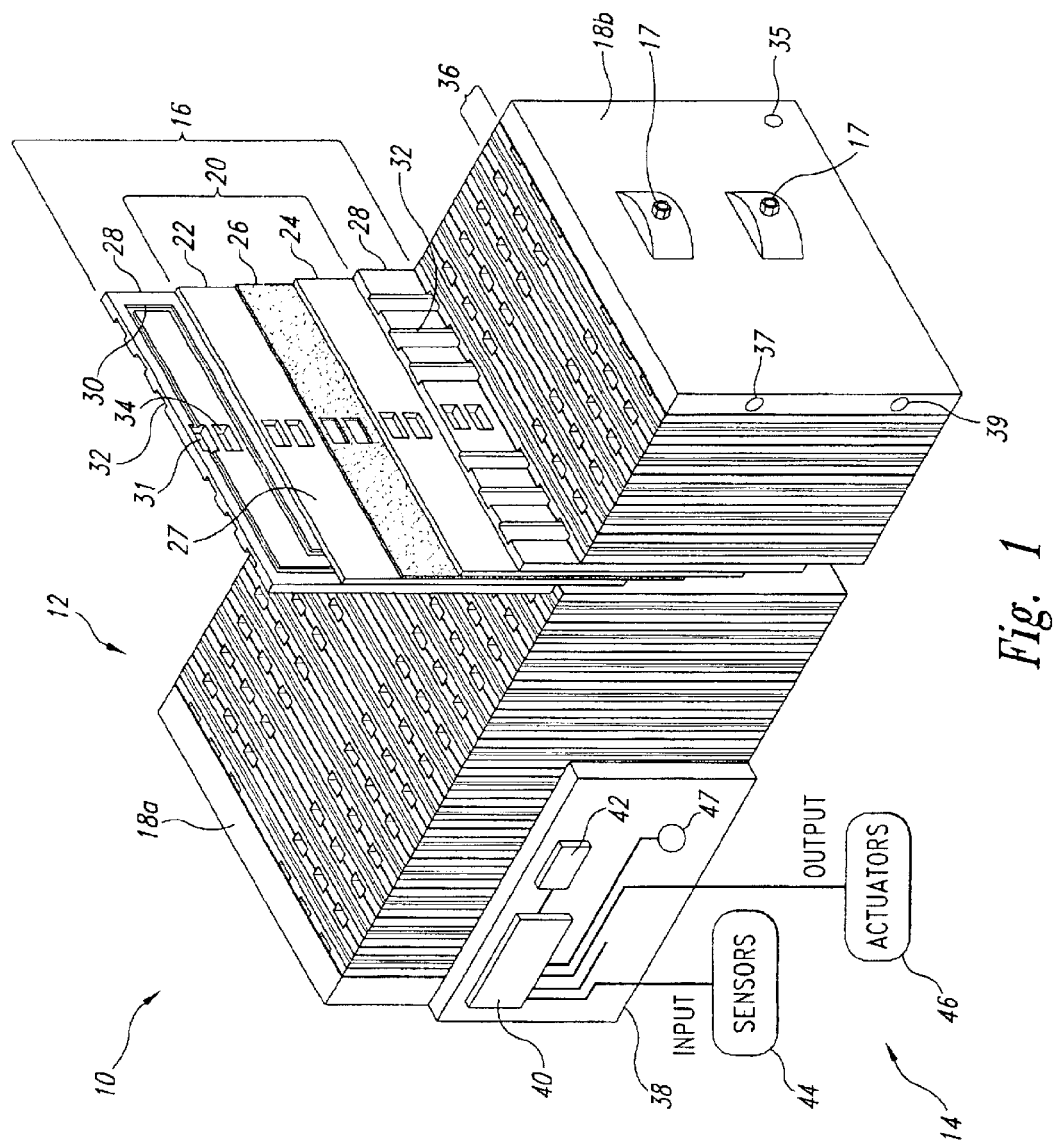
FIG. 1 is an isometric view of an illustrative fuel cell system including an exemplary fuel cell stack with one of the fuel cells partially removed to better illustrate the fuel cell structure.

FIG. 1 shows a portion of a fuel cell system 10, namely, a fuel cell stack 12 and an electronic fuel cell monitoring and control system 14. Fuel cell stack 12 includes a number of fuel cell assemblies 16 arranged between a pair of end plates 18a, 18b, one of the fuel cell assemblies 16 being partially removed from fuel cell stack 12 to better illustrate the structure of fuel cell assembly 16. Tie rods (not shown) extend between end plates 18a, 18b and cooperate with fastening nuts 17 to bias end plates 18a, 18b together by applying pressure to the various components to ensure good contact therebetween.

Each fuel cell assembly 16 includes a membrane electrode assembly 20 including two electrodes, the anode 22 and the cathode 24, separated by an ion exchange membrane 26. Electrodes 22, 24 can be formed from a porous, electrically conductive sheet material, such as carbon fiber paper or cloth, that is permeable to the reactants. Each of electrodes 22, 24 is coated on a surface adjacent the ion exchange membrane 26 with a catalyst 27, such as a thin layer of platinum, to render each electrode electrochemically active. In some embodiments, the catalyst may include ruthenium or other noble metals.

Fuel cell assembly 16 also includes a pair of separators or flow field plates 28 sandwiching membrane electrode assembly 20. As illustrated, each of the flow field plates 28 includes one or more reactant channels 30 formed on a planar surface of flow field plate 28 adjacent an associated one of the electrodes 22, 24 for carrying fuel to anode 22 and oxidant to cathode 24, respectively. (Reactant channel 30 on only one of flow field plates 28 is visible.) Reactant channels 30 that carry the oxidant also carry exhaust air and product water away from cathode 24. The fuel stack 12 is designed to operate in a dead-ended fuel mode, thus substantially all of the hydrogen fuel supplied to it during operation is consumed, and little if any hydrogen is carried away from stack 12 in normal operation of system 10. However, embodiments of the present invention can also be applicable to fuel cell systems operating on dilute fuels which are not dead-ended.

Each flow field plate 28 preferably includes a plurality of cooling channels 32 formed on the planar surface of the flow field plate 28 opposite the planar surface having reactant channel 30. When the stack 12 is assembled, cooling channels 32 of each adjacent fuel cell assembly 16 cooperate so that closed cooling channels 32 are formed between each membrane electrode assembly 20. The cooling channels 32 transmit cooling air through fuel stack 12. While the illustrated embodiment includes two flow field plates 28 in each fuel cell assembly 16, other embodiments can include a single bipolar flow field plate (not shown) between adjacent membrane electrode assemblies 20.

One end plate 18a includes a fuel stream inlet port (not shown) for introducing a supply fuel stream into fuel cell stack 12. The other end plate 18b includes a fuel stream outlet port 35 for discharging an exhaust fuel stream from fuel cell stack 12 that comprises primarily water and non-reactive components and impurities, such as any introduced in the supply fuel stream or entering the fuel stream in stack 12. Fuel stream outlet port 35 is normally closed with a valve in dead-ended operation. Although fuel cell stack 12 is designed to consume substantially all of the hydrogen fuel supplied to it during operation, traces of unreacted hydrogen may also be discharged through the fuel stream outlet port 35 during a purge of fuel cell stack 12, effected by temporarily opening a valve at fuel stream outlet port 35. Each fuel cell assembly 16 has openings formed therein to cooperate with corresponding openings in adjacent assemblies 16 to form internal fuel supply and exhaust manifolds (not shown) that extend the length of stack 12. The fuel stream inlet port is fluidly connected to fluid outlet port 35 via respective reactant channels 30 that are in fluid communication with the fuel supply and exhaust manifolds, respectively.

The other end plate 18b includes an oxidant stream inlet port 37 for introducing supply air (oxidant stream) into fuel cell stack 12, and an oxidant stream outlet port 39 for discharging exhaust air from fuel cell stack 12. Each fuel cell assembly 16 has openings 31, 34, formed therein to cooperate with corresponding openings in adjacent fuel cell assemblies 16 to form oxidant supply and exhaust manifolds that extend the length of stack 12. Oxidant inlet port 37 is fluidly connected to oxidant outlet port 39 via respective reactant channels 30 that are in fluid communication with oxidant supply and exhaust manifolds, respectively.

In one embodiment, fuel cell stack 12 includes forty-seven fuel cell assemblies 16. (FIGS. 1 and 2 omit a number of the fuel cell assemblies 16 to enhance drawing clarity). Fuel cell stack 12 can include a greater or lesser number of fuel cell assemblies to provide more or less power, respectively. Each membrane electrode assembly 20 is designed to produce a nominal potential difference of about 0.6 V between anode 22 and cathode 24 during operation. Reactant streams (hydrogen and air) are supplied to electrodes 22, 24 on either side of ion exchange membrane 26 through reactant channels 30. Hydrogen is supplied to anode 22, where platinum catalyst 27 promotes its separation into protons and electrons, which pass as useful electricity through an external circuit (not shown). On the opposite side of membrane electrode assembly 20, air flows through reactant channels 30 to cathode 24 where oxygen in the air reacts with protons passing through the ion exchange membrane 26 to produce product water.

Automated Test System

Figure 2:
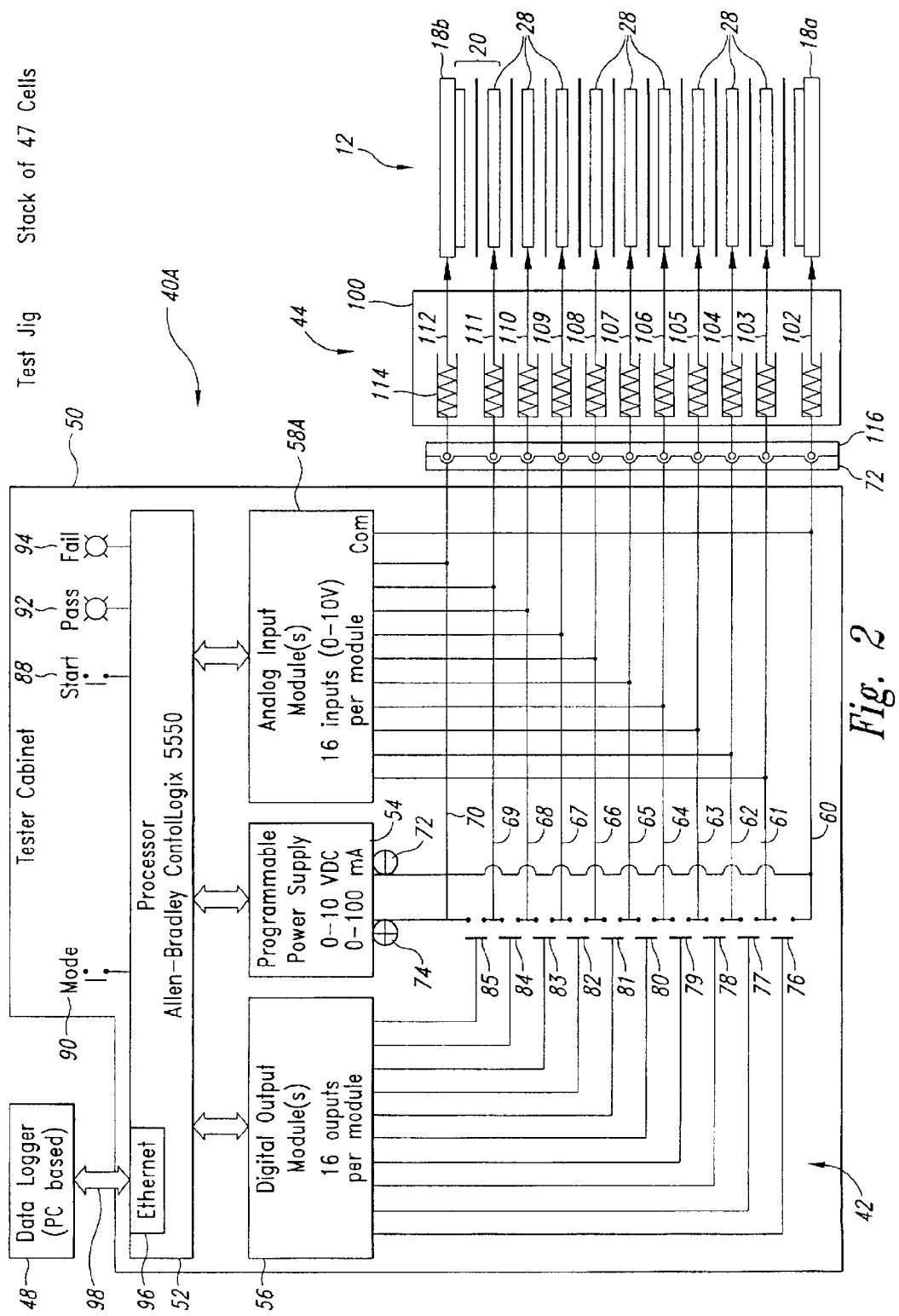
FIG. 2 is a schematic diagram of an illustrative fuel cell stack test system and fuel cell stack, the fuel cell stack test system including test electronics, a test head of a test jig, and a computing system coupled to the test electronics via a network.

FIG. 2 shows an automated test system 40A for testing the fuel cell stack 12, including automatically testing the resistance of the membrane electrode assemblies 20 of the fuel cell stack 12. The automated test system 40A includes testing electronics 42 for electrically testing the fuel cell stack 12 and a test jig 44 for making electrical connections between the testing electronics 42 and various elements of the fuel cell stack 12. The test system 40A can also include a computing system 48 for storing and/or analyzing test data.

The testing electronics 42 can be housed in an electrically insulating and grounded tester cabinet 50 to provide protection for an operator from inadvertent shocks. The testing electronics 42 include a processor 52 controllingly coupled to a programmable power supply 54, one or more digital output modules 56, and one or more analog input modules 58A. A suitable processor is a ControlLogix 5550, commercially available from Rockwell Automation under the brand Allen-Bradley. A suitable programmable power supply 54 may be capable of providing from 0–10 VDC at 0–100 mA. The analog input modules 58A include a number of conventional voltage sensors and a conventional current sensor (not individually illustrated). For example, the automated test system 40A can include one voltage sensor for each of the membrane electrode assemblies 20 in the fuel cell stacks 12 to be tested. The voltage sensors can be accurate to 1 mV.

The testing electronics 42 include a number of test lines 60–70 terminating in a first connector 72. The number of test lines 60–70 is equal to one more than the number of membrane electrode assemblies 20 in the fuel cell stacks 12 to be tested. Thus, for example, a test system 40A for testing a fuel cell stack 12 having forty-seven membrane electrode assemblies includes forty-eight (48) test lines. (FIG. 2 only shows ten (10) test lines for ease of illustration, although one skilled in the art will recognize that the testing electronics 42 can include a greater or lesser number of test lines 60–70 as suitable for the particular application.) One test line 60 is coupled to a negative output 72 of the programmable power supply 54 and another test line 70 is coupled to a positive output 72 of the programmable power supply 54. Each of the other test lines 61–69 are selectively couplable to the negative output 72 and positive output 74 of the programmable power supply 54 by way of a number of shorting switches 76–85. Where the automated test system 40A allows cell-by-cell testing, there is one shorting switch 76–85 for each of the membrane electrode assemblies 20 in the fuel cell stacks 12 to be tested. The shorting switches 76–85 provide selective coupling between each pair of adjacent test lines 60–70. The shorting switches 76–85 are controlled by the processor 52 via digital output of the digital output module(s) 56. Inputs of the analog input module(s) 58A are coupled to respective ones of the test lines 60–70.

The testing electronics 42 include a number of input/output ("I/O") components. For example, an operator actuable start switch 88 is coupled to the processor 52 for providing a start signal to the processor 52 in response to operator selection. An operator actuable mode switch 90 is coupled to the processor 52 to provide a mode signal to the processor 52 in response to operator selection. The mode switch 90 permits the operator to select between a stack test mode in which the entire fuel cell stack 12 is tested at one time and a cell-by-cell test mode in which the membrane electrode assemblies 20 of the fuel cell stack 12 are tested one at a time. A pass indicator 92, such as a green light emitting diode ("LED"), and a fail indicator 94, such as a red LED, are coupled to the processor 52 for providing a pass/fail indication to the operator in response to an outcome of a test. An Ethernet interface 96 is coupled to the processor 52 for providing networked communications over a network 98 with external devices, such as the computing system 48.

The test jig 44 includes a test head 100, having a number of probes 102–112 for making electrical contact with elements of the fuel cell stack 12. The test head 100 can include a number of biasing mechanisms, such as springs 114, to bias the probes 102–112 generally outward from the test head 100 for ensuring good electrical contact with the elements of the fuel cell stack 12. The probes 102–112 are positioned and spaced in the test head 100 such that one 102 and another probe 112 are aligned to contact respective endplates 18a, 18b of the fuel cell stack 12, and the remaining probes 103–111 are aligned to contact respective ones of the separators or flow field plates 28 of the fuel cell stack 12.

The test jig 44 also includes a second connector 116 coupled to the probes 102–112. The second connector 116 is sized and shaped to mate with the first connector 72 of the testing electronics 42 to provide a selectively releasable coupling to the testing electronics 42. Thus, the test lines 60, 70 are each coupled to a respective one of the endplates 18a, 18b, and the test line 62–68 are each coupled to a respective one of the flow field plates 28.

Figure 3:
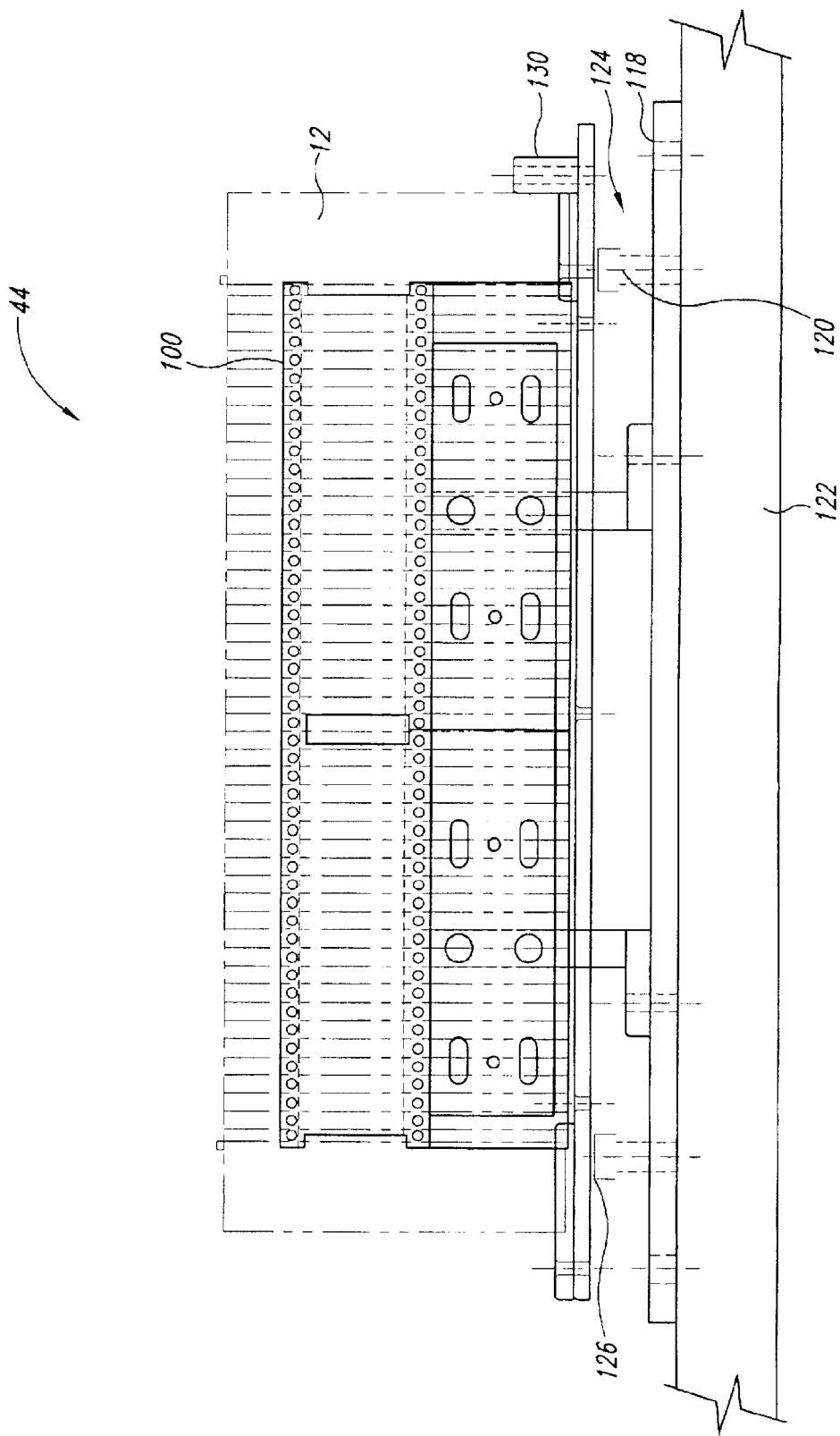
FIG. 3 is a front plan view of the test jig including a linear bearing track supporting a linear bearing carriage for moving a fuel cell stack (illustrated transparently in broken line) into electrical contact with the test head.
Figure 4:
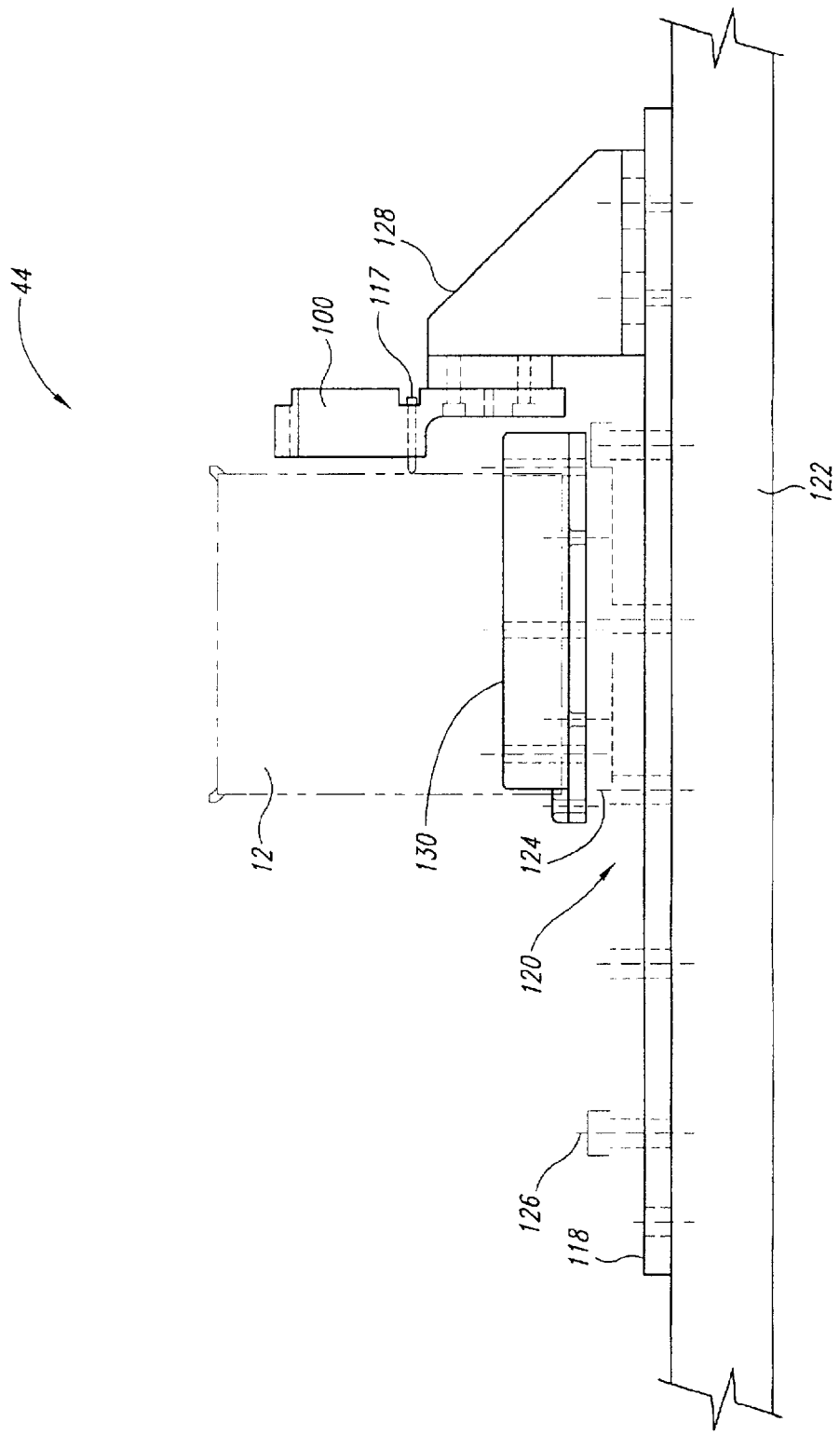
FIG. 4 is a side elevational the test jig and fuel cell stack of FIG. 3.

FIGS. 3 and 4 show additional components of the test jig 44 for further assuring proper alignment and contact of electrical contacts formed as probes 117 with the fuel cell stack 12. The test jig 44 includes a base plate 118 supporting a linear bearing track 120. The base plate 118 can be fixedly mounted on a table top 122 or other surface to prevent accidental movement during operation. A linear bearing carriage rides 124 on the linear bearing track 120 between a stopper 126 and the test head 100. A test head support bracket 128 supports the test head 100 above the base plate 118. The fuel cell stack 12 is carried by a cell stack tray 130, which is in turn carried by the linear bearing carriage 124. Thus, the fuel cell stack 12 can be loaded into the cell stack tray 130 and slid into aligned contact with the probes 102–112 of the test head 100 in one easy motion. The use of multiple probes 102–112 eliminates the need to successively move a single probe between each of the membrane electrode assemblies 20, eliminating the need for constant supervision and reducing the time it takes to perform a test of the fuel cell stack 12. Further, the test system 40A can include additional interchangeable test heads 100 having different probe spacing to accommodate fuel cell stacks having different average cell thickness.

Exemplary Methods of Operation

Applicants have determined that for typical carbon based electrodes 22, 24 (FIG. 1), oxidation becomes a problem at approximately 1.3V. Applicants have also determined that where the catalyst 27 includes ruthenium, oxidation becomes a problem at the lower potential of approximately 1.2V. Applicants have further determined that in air, there is typically a potential of approximately 900 mV across an electrode 22, 24. Thus, for typical carbon based electrodes 22, 24 having a catalyst without ruthenium, the maximum potential applied or resulting from an applied current should be less than approximately 400 mV to avoid damage. For typical carbon based electrodes 22, 24 having a catalyst including ruthenium, the maximum potential applied or resulting from an applied current should be less than approximately 300 mV to avoid damage. The automated test system 40A employs a safe operating limit of approximately 50% or less of these maximum limits, corresponding to an applied potential of approximately 200 mV for electrodes 22, 24 without a ruthenium containing catalyst and an applied potential of approximately 100 mV for electrodes 22, 24 having a ruthenium containing catalyst 27. Applicants have determined that these limits adequately balance reduced test time associated with higher voltages and the risk of damage associated with those higher voltages.

Figure 5:
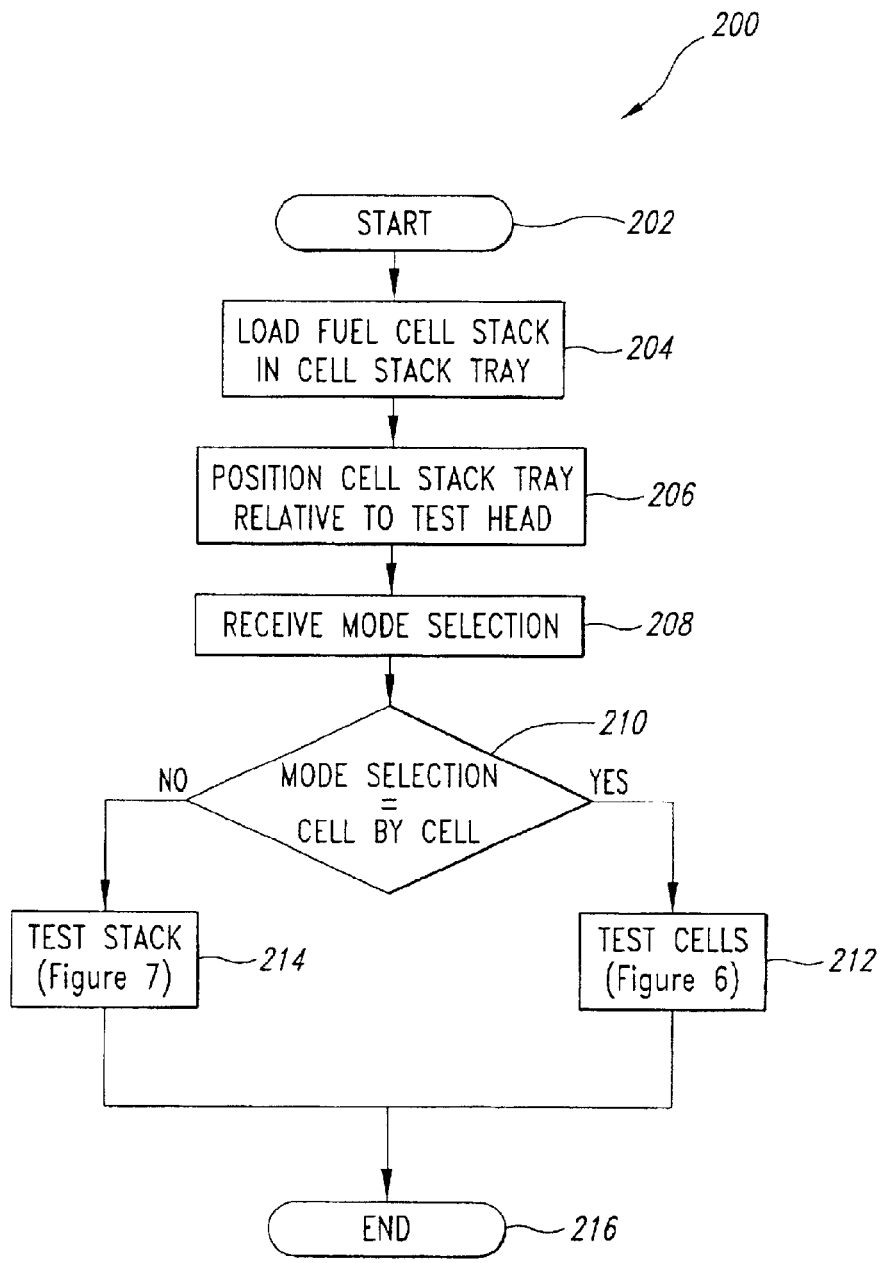
FIG. 5 is a high level flow diagram of an exemplary method of operation for the test system of FIGS. 2–4.
Figure 6:
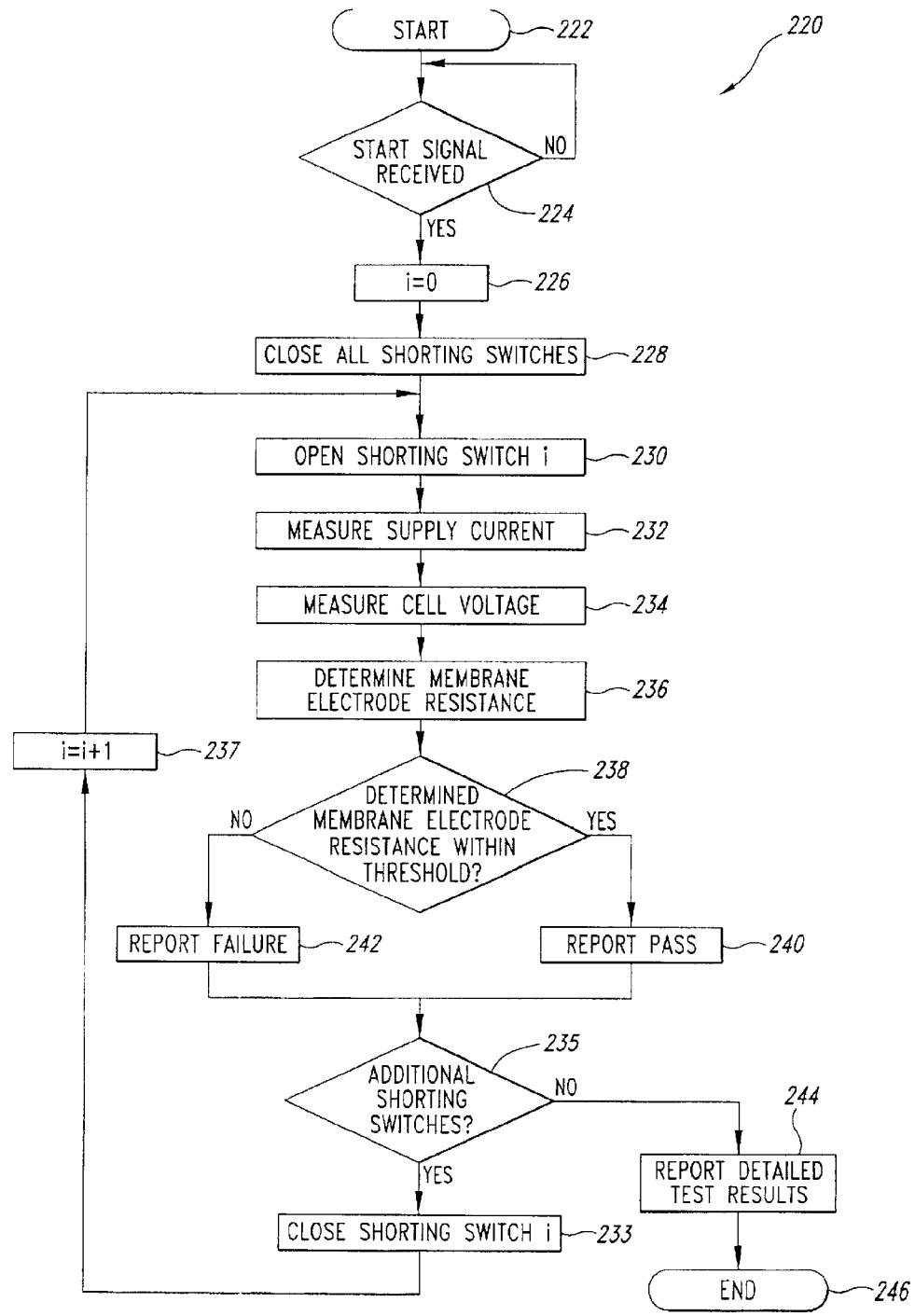
FIG. 6 is a low level flow diagram of a portion of the method of FIG. 4, showing operation of a cell-by-cell test mode.
Figure 7:
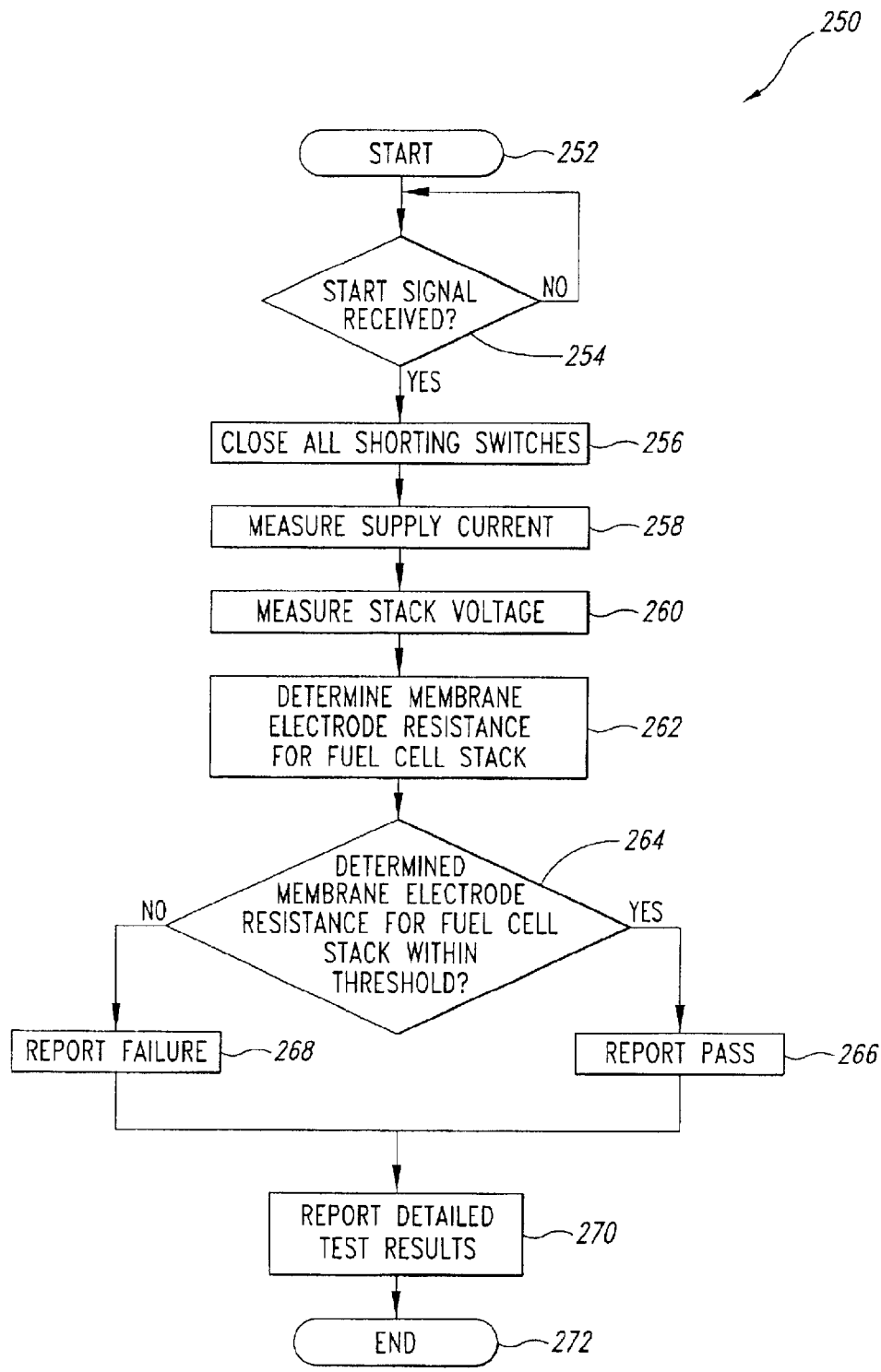
FIG. 7 is a flow diagram of a portion of the method of FIG. 4, showing operation of a stack test mode.

FIGS. 5–7 show an exemplary method of operation 200 for the test system 40A, starting at step 202. With reference to FIG. 5, in step 204, the fuel cell stack 12 is initially loaded onto the cell stack tray 130 and the cell stack tray 130 loaded on the linear bearing carriage 124. In step 206, the linear bearing carriage 130 is manually or automatically positioned with respect to the test head 100. The linear bearing carriage 130 can be manually positioned by the operator sliding or rolling the linear bearing carriage 130 toward the test head 100. Alternatively, test system 40A can include a motor and drive system (not shown) to slide or roll the linear bearing carriage 130 toward the test head 100 in response to operator selection of the start switch 88. As described above, the structure assures that a simple sliding or rolling movement accurately aligns all of the probes 102–112 with respective elements of the fuel cell stack 12.

In step 208, the test system 40A receives the mode selection from the operator. In step 210, the test system 40A determines whether the operator has selected the cell-by-cell test mode or the stack test mode. If the operator has selected the cell-by-cell test mode, in step 212 the test system 40A, and in particular the processor 52, performs the cell-by-cell test, for example, as illustrated in a cell-by-cell test method 220 of FIG. 6. If the operator has selected the stack test mode, in step 214 the test system 40A, and in particular the processor 52 executes the stack test, for example, as illustrated in a stack test method 250 of FIG. 7. The method 200 terminates in step 216.

FIG. 6 shows the cell-by-cell test mode method 220, starting in step 222. In step 224, the processor 52 determines whether a start signal has been received from the start switch 88. In some embodiments, step 224 can occur before step 210 (FIG. 5). In step 226, the processor 52 initializes a shorting switch counter i. In step 228, the processor 52 initially closes all of the shorting switches 76–86, shorting all of the membrane cell assemblies 20 of the fuel cell stack 12.

If, as was determined in step 210 (FIG. 5), the operator has selected the cell-by-cell test mode, the processor 52 opens each of the shorting switches 76–85 one at a time 230, applying an applied voltage across the respective membrane electrode assembly 20, and measures the resulting supply current and cell voltage 232, 234, respectively. Thus, the test system 40A automatically opens one shorting switch 76–85 at a time, closing the shorting switch 76–85 in step 233 after measuring the resulting supply current and cell voltage and before opening the next shorting switch 76–85. The processor 52 can determine whether there are additional shorting switches in step 235 and increment the shorting switch counter in step 237, successively testing each of the membrane electrode assemblies 20. The test system 40A may, or may not open the shorting switches 76–85 in sequential order of the physical position of the shorting switches 76–85 with respect to one another. The test system 40A may open more than one shorting switch 76–85 at a time to simultaneously test non-adjacent membrane electrode assemblies 20, where the effects of the non-adjacent membrane electrode assemblies 20 on each other are well understood and accounted for in the mathematical calculations, thereby further reducing the time required for testing the entire fuel cell stack 12.

In step 236, the processor 52 or the computing system 48 determines the membrane leakage resistance for the membrane electrode assembly 20 based on the measured supply current and cell voltage. The processor 52 or computing system 48 can determine the membrane leakage resistance for the membrane electrode assembly 20 upon receiving the measured supply current and cell voltage, or can wait until the measured supply current and cell voltages for some or all of the membrane electrode assembly 20 have been received.

In step 238, the processor 52 or computing system 48 compares the determined membrane leakage resistance with a membrane leakage resistance threshold. The threshold for membrane rejection can, for example, be set at 5.15 Ohms (i.e., 5 Ohms +3%), to ensure that 99% of membranes with membrane resistances below 5 Ohm are rejected. The test system 40A can provide results based on the comparison to the operator, for example by activating the appropriate pass or fail indicator 92, 94 in steps 240, 242, respectively. Alternatively, the processor 52 or computing system 48 can determine whether the resulting current to an acceptable current range for the applied voltage.

In step 244, the test system 40A can additionally, or alternatively, pass testing information and/or results to the computing system 48 for analysis, and/or reporting. For example, the computing system 48 can visually display the test results in table, spreadsheet, and/or graphically form. The test results can include, for example, the membrane resistances and settling times for each of the membrane electrode assemblies 20. The test results can additionally or alternatively take the form of a real time graphical display of the voltages and membrane resistances. Test results can also be provided in paper form, or stored in computer-readable media, employing conventional data compression techniques. The cell-by-cell testing method 220 terminates in step 246.

FIG. 7 shows the stack test mode method 250, starting in step 252. In step 254, the processor 52 determines whether a start signal has been received from the start switch 88. In some embodiments, step 254 can occur before step (FIG. 5) 210. In step 256, the test system 40A closes all of the shorting switches 76–85, applying an applied voltage across all of the membrane electrode assemblies 20 of the fuel cell stack 12. If, as was determined in step 210 (FIG. 5) the operator has selected the stack test mode, the processor 52 or computing system 48 determines measures the stack supply current in step 258 and the stack voltage in step 260. In step 262, the processor 52 determines the membrane leakage resistance for entire fuel cell stack 12 based on the measured stack supply current and stack voltage. In step 264, the processor 52 or the computing system 48 compares the determined membrane leakage resistance to a membrane leakage resistance threshold. The test system 40A can provide results based on the comparison to the operator, for example by activating the appropriate pass or fail indicator 92, 94 in steps 266, 268, respectively. In step 270, the test system 40A can additionally, or alternatively pass testing information and/or results to the computing system 48 for analysis, and/or reporting. For example, the computing system 48 can visually display the test results in table and/or graphically form. The stack test mode method 250 terminates in step 272.

Figure 8:
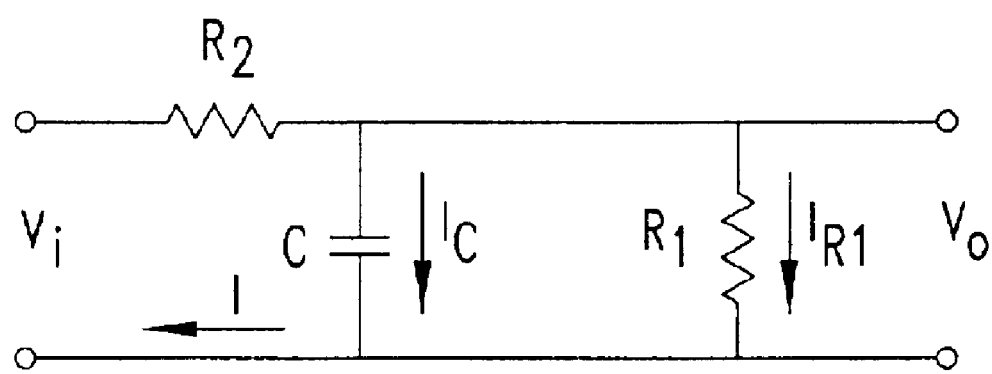
FIG. 8 is an electrical schematic of a test model.

FIG. 8 shows an electrical schematic representation of a test model in which $R_1$ represents the resistance associated with the membrane electrode assembly 20, $R_2$ the circuit resistance (typically 0.1 to 0.2 Ohms), C the plate capacitance associated with the membrane electrode assembly, $V_1$ the input voltage (100 to 200 mV), $V_0$ the output voltage, and I the output current. The value of output voltage I is given by the formula:

$$I = I_C + I_{R1} = (R_1 + R_2)^{-1} + R_1 * (R_1 + R_2)^{-1} * R_2^{-1} * e^{-t/Tc},$$

where the time constant $Tc = R_1 * R_2 * C / (R_1 + R_2)$.

Figure 9:
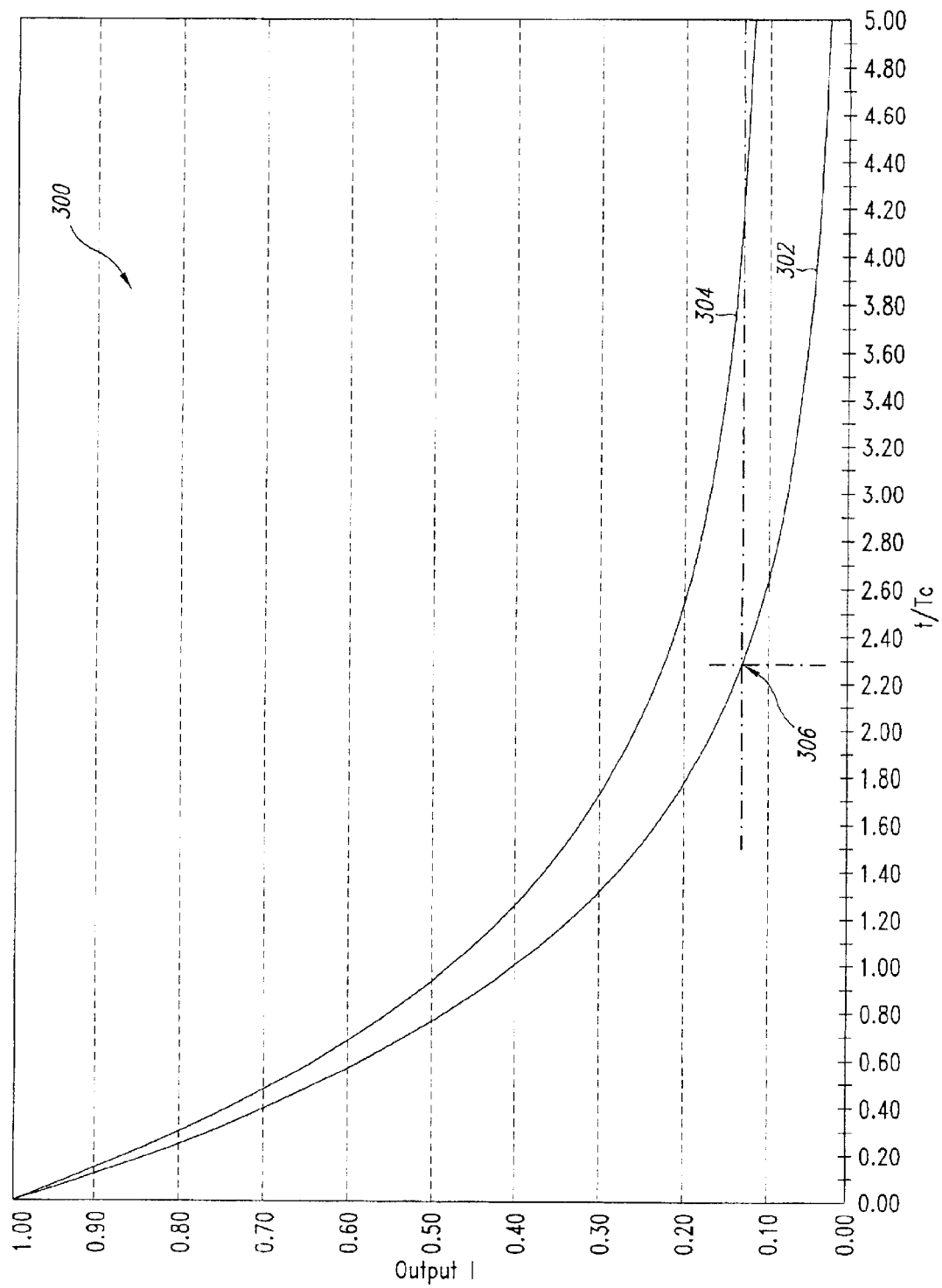
FIG. 9 is a graph showing exemplary satisfactory and an unsatisfactory responses by a membrane electrode assembly to an applied voltage.

FIG. 9 shows a graph 300 of a response 302 for a membrane electrode assembly to an applied voltage having a satisfactory membrane resistance characteristics and a response 304 for a membrane electrode assembly having unsatisfactory membrane resistance characteristics. Normalized time is plotted along the horizontal axis and resulting current plotted along the vertical axis of the graph 300. An exemplary reading point 306 for reading the current is identified in the graph 300.

Alternative Embodiment

Figure 10:
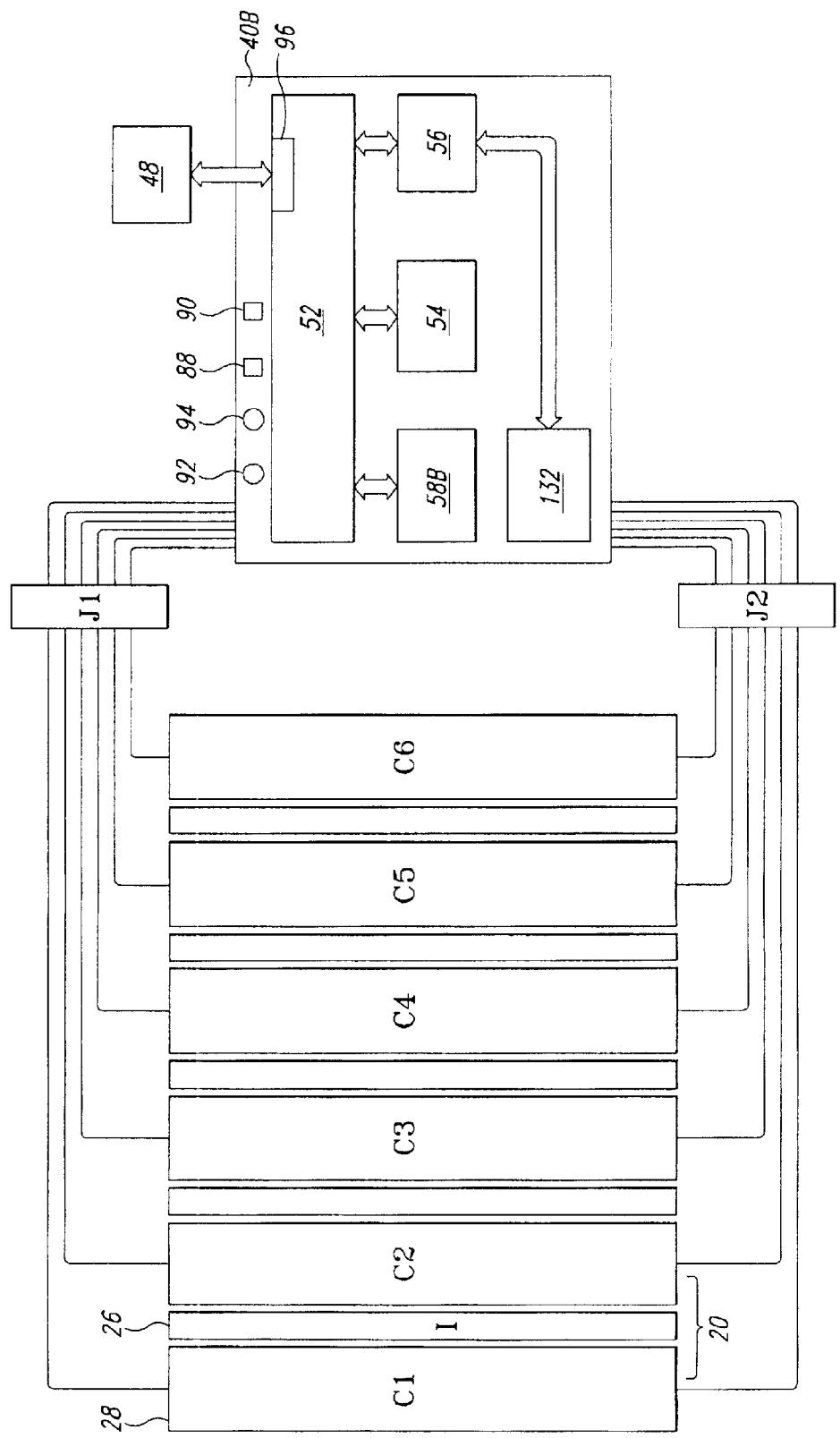
FIG. 10 a schematic diagram of an illustrative alternative fuel cell stack test system, fuel cell stack and a computing system coupled to the fuel cell stack test system via a network.

FIG. 10 shows an alternative embodiment of a fuel cell test system 40B, that employs an applied current rather than an applied voltage. This alternative embodiment, and those alternative embodiments and other alternatives described herein, are substantially similar to previously described embodiments, and common acts and structures are identified by the same reference numbers. Only significant differences in operation and structure are described below.

The alternative fuel cell test system 40B employs a set of switches 132 controlled by the processor 52 via the digital output module(s) to selectively couple applied currents to successive ones of the separators or flow field plates 28 of the fuel cell stack 12. The processor 52 may be of the same or similar type as that described above for the test system 40A, however the processor 52 is configured appropriately apply the current to each separator 28 and to analyze the results. For example, the processor 52 in test system 40B can execute a different set of instructions than instructions executed by the processor 52 in the test system 40A. The test system 40B employs analog input module(s) 58B, having voltage sensors to determine the voltage of across membrane electrode assemblies 20. The test system 40B further employs a first connector J1, to releasably couple a respective first end of each separator or flow field plate 28 to the test system 40B, and a second connector to removable couple a respective second end of each separator or flow field plate 28 to the test system 40B.

Figure 11:
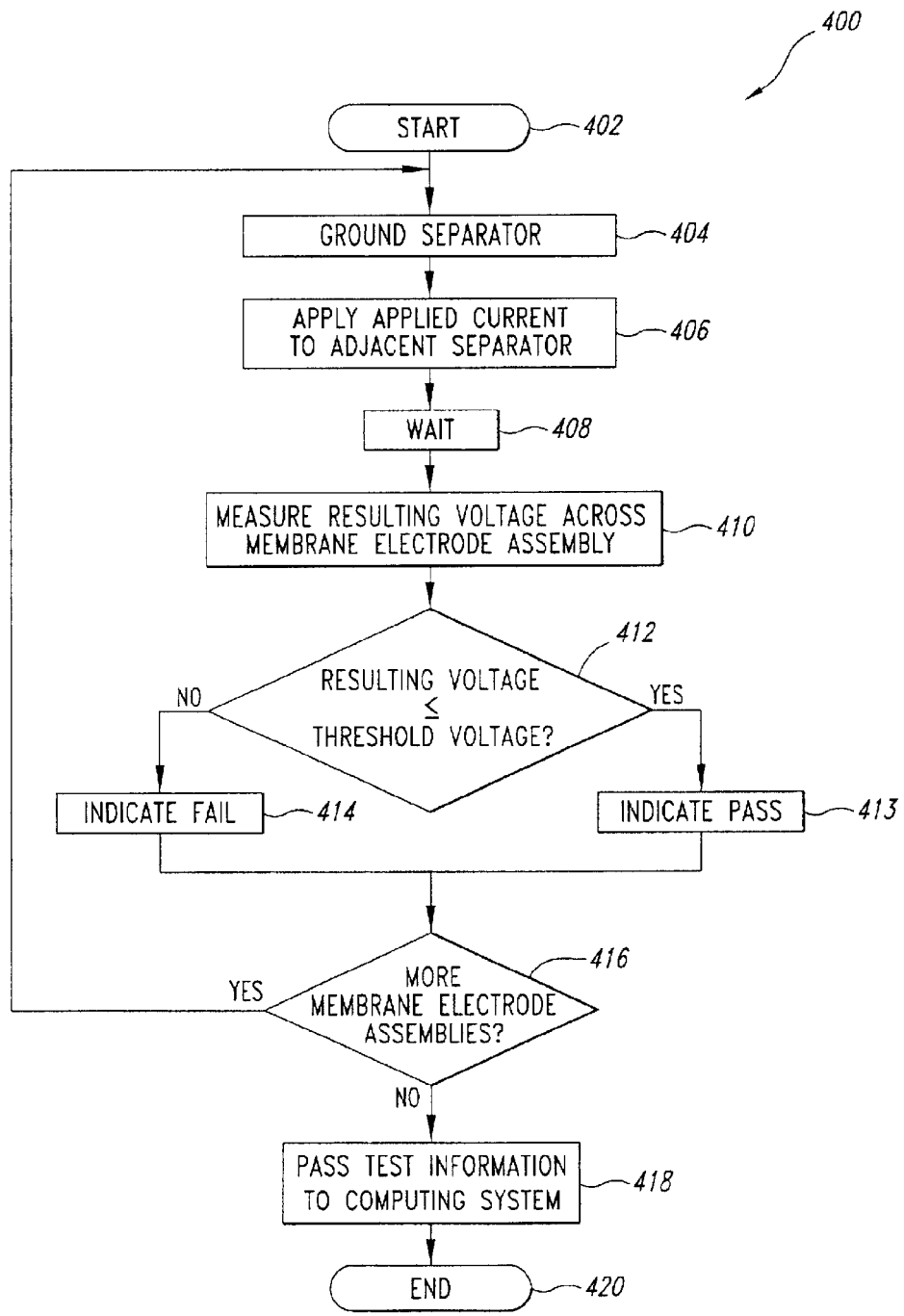
FIG. 11 is a flow diagram of an exemplary method of operation for the alternative fuel cell stack test system of FIG. 10.

FIG. 11 shows an exemplary method 400 of operation for the alternative test system 40B, starting in step 402. In step 404, the test system 40B grounds one separator or flow field plate 28, and applies an applied current to the other separator or flow field plate 28 in step 406. A suitable applied current can be approximately 5 mA. The system 40B applies the applied current for a defined period of time which is less than the period required to reach steady state. For example, in step 408 the test system 40B waits for approximately 20 seconds before measuring the resulting voltage across the membrane electrode assembly 20 in step 410. While voltage will not have stabilized, the transient voltage response is sufficient predictable to be compared to expected responses for membrane electrode assemblies 20 having satisfactory membrane resistance characteristics.

In step 412, the test system 40B, or the computing system 48, determines if the membrane electrode assembly's 20 performance is within a defined threshold. For example, the test system 40B compares the resulting voltage to a defined voltage threshold. A suitable defined voltage threshold can be approximately 50 mV. Thus, if the resulting voltage is less than 50 mV, the membrane electrode assembly 20 passes the test, otherwise the membrane electrode assembly fails. Alternatively, the test system 40B can determine the membrane resistance from the applied current and the resulting voltage and compare the determined membrane resistance to a defined membrane resistance threshold value. The test system 40B activates the appropriate pass or fail indicator 92, 94 based on the outcome of the test in steps 413, 414, respectively. In step 416, the test system 40B determines if there are additional membrane electrode assemblies 20 to test, repeating the previous steps for each of the membrane electrode assemblies in the stack 12. A hardwired multiplexing circuit can avoid the need for the above determination.

In step 418, the test system 40A can additionally, or alternatively, pass testing information and/or results to the computing system 48 for analysis, and/or reporting. For example, the computing system 48 can visually display the test results in table, spreadsheet, and/or graphically form. The test results can include, for example, the membrane resistances and settling times for each of the membrane electrode assemblies 20. The test results can additionally or alternatively take the form of a real time graphical display of the voltages and membrane resistances. Test results can also be provided in paper form, or stored in computer-readable media, employing conventional data compression techniques. The method terminates in step 420.

While not explicitly illustrated, the alternative test system 40B can test the fuel cell stack 12 (i.e., stack test mode). Under this further alternative, the test system 40B may require fewer components, reducing complexity and cost, but will typically result in lower resolution. For example, a number of satisfactorily performing membrane electrode assemblies 20 can mask the unsatisfactory performance of one or more membrane electrode assemblies 20. This is particularly a problem where the fuel cell stack 12 contains a large number membrane electrode assemblies 20.

Although specific embodiments, and examples of, the invention are described herein for illustrative purposes, various equivalent modifications can be made without departing from the spirit and scope of the invention, as will be recognized by those skilled in the relevant art. The teachings provided herein of the invention can be applied to other fuel cell systems, not necessarily the solid polymer fuel cell system described above. For example, where the test system 40A does not permit cell-by-cell testing, the test system 40A can eliminate many of the shorting switches, reducing cost and complexity. Where the test system 40A does not permit testing the entire stack, the test system 40A can eliminate many of the voltage sensors. While the illustrated embodiments generally disclose electrically contacting the separators or flow field plates 28, in some alternatives, electrical contact can be made directly to the anode 22 and cathode 24 of the membrane electrode assemblies 20.

The various embodiments described above and in the applications and patents incorporated herein by reference, including, but not limited to, U.S. patent application Ser. No. 10/066,316, filed Oct. 22, 2001, entitled "METHOD, APPARATUS AND ARTICLE TO TEST FUEL CELLS," and incorporated herein by reference in its entirety, can be combined to provide further embodiments. The described methods can omit some acts and can add other acts, and can execute the acts in a different order than that illustrated, to achieve the advantages of the invention.

These and other changes can be made to the invention in light of the above detailed description. In general, in the following claims, the terms used should not be construed to limit the invention to the specific embodiments disclosed in the specification, but should be construed to include all fuel cell systems, controllers and processors, actuators, and sensors that operate in accordance with the claims. Accordingly, the invention is not limited by the disclosure, but instead its scope is to be determined entirely by the following claims.

What is claimed is:

1. A fuel cell resistance test system, comprising:
 a voltage source selectively operable to produce a defined voltage;
 a contact head having at least three electrical contacts for contacting a plurality of fuel cells in a fuel cell stack;
 means for applying the defined voltage produced by the voltage source successively across pairs of adjacent ones of the electrical contacts;
 a current sensor coupled to the electrical contacts to measure a resulting supply current; and
 a processor coupled to receive signals corresponding to at least one of the magnitude of the defined voltage and the magnitude the resulting current, the processor configured to determine whether a short exists in at least one of the fuel cells based on the magnitude of the defined voltage and the magnitude of the resulting current.

2. The fuel cell resistance test system of claim 1 wherein the processor is configured to determine whether a short exists based on the magnitude of the defined voltage and the magnitude of the resulting current, by:
 determining whether the magnitude of the resulting current is within an acceptable resulting current range for the defined voltage.

3. The fuel cell resistance test system of claim 1 wherein the processor is configured to determine whether a short exists based on the magnitude of the defined voltage and the magnitude of the resulting current, by:
 determining a resistance based on the magnitude of the resulting current and the magnitude of the defined voltage; and
 determining whether the determined resistance is within an acceptable resistance range for the defined voltage.

4. The fuel cell resistance test system of claim 1, further comprising
 a carriage selectively positionable between a first position where all of the electrical contacts are in physical contact with respective portions of a fuel cell stack to be tested and a second position spaced from the first position.

5. The fuel cell resistance test system of claim 1, further comprising
 a start switch selectively operable to operate the defined voltage applying means.

6. The fuel cell resistance test system of claim 1, further comprising:
 a first connector coupled to the voltage supply; and
 a second connector coupled to the electrical contacts, the first and the second connectors sized and shaped to matingly couple with one another to provide a selectively releasable connectable electrical connection between the voltage supply and the electrical contacts.

7. The fuel cell resistance test system of claim 1 wherein at least a portion of each of the electrical contacts form a coplanar array.

8. The fuel cell resistance test system of claim 1 wherein the voltage source produces a defined voltage of approximately 100 mV for testing membrane electrode assemblies having catalysts including ruthenium.

9. The fuel cell resistance test system of claim 1 wherein the voltage source produces a defined voltage of approximately 200 mV for testing membrane electrode assemblies having catalysts not including ruthenium.

10. The fuel cell resistance test system of claim 1 wherein the voltage source produces a defined voltage between approximately 100 mV and 300 mV for testing membrane electrode assemblies having catalysts including ruthenium.

11. The fuel cell resistance test system of claim 1 wherein the voltage source produces a defined voltage between approximately 200 mV and 400 mV for testing membrane electrode assemblies having catalysts not including ruthenium.

12. A fuel cell resistance test system, comprising:
a contact head having a plurality of spaced electrical contacts for contacting a plurality of fuel cells in a fuel cell stack;
a plurality of switches, each of the switches selectively actuable to produce a short between a respective pair of adjacent ones of the electrical contacts;
a voltage soiree selectively operable to produce a defined voltage;
a processor coupled to open each of the switches, one at a time in succession, to apply the defined voltage from the voltage source successively across pairs of adjacent ones of the electrical contacts; and
at least one current sensor coupled to the electrical contacts to measure a resulting current; and
the processor coupled to receive signals corresponding to the magnitude of the defined voltage and the magnitude the resulting current, and configured to determine whether a short exists in at least one of the fuel cells based on the magnitude of the defined voltage and the magnitude of the resulting current.

13. The fuel cell resistance test system of claim 12, further comprising:
a controller coupled between the processor and the switches to activate the switches in response to at least one signal from the processor.

14. The fuel cell resistance test system of claim 12, further comprising:
at least one pass/fail indicator coupled to the processor for selective activation in response to.

15. The fuel cell resistance test system of claim 12 wherein the electrical contacts take the form of spring loaded probes, extending at least partially from the test head.

16. The fuel cell resistance test system of claim 12, further comprising
a tray sized and dimensioned for receiving fuel cell stacks;
a linear guide; and
a carriage sized and dimensioned for receiving the tray, the carriage received on the linear guide for movement therealong between a first position where each of the electrical contacts are in physical contact with a respective portion of a fuel cell stack carried on the tray and a second position spaced from the first position.

17. The fuel cell resistance test system of claim 12, further comprising
a computing system including a central processing unit and a display, the computing system coupled to the processor to receive sets of voltage and current measurements and configured to display the received sets of voltage and current measurements on the display in a graphical from.

18. A method of testing fuel cell stacks, comprising:
simultaneously coupling a plurality of spaced electrical contacts to respective portions of a fuel cell stack;
successively applying a defined voltage between each respective pair of adjacent ones of the electrical contacts;
successively measuring a respective current resulting from each of the applied defined voltages before reaching a steady state condition; and
determining whether a short exists in at least one of the fuel cells based on the defined voltages and the resulting currents.

19. The method of claim 18 wherein at least a portion of each of the electrical contacts are co-planar and simultaneously coupling a plurality of spaced electrical contacts to respective portions of a fuel cell stack includes moving the fuel cell stack along a linear guide toward a plane defined by the co-planar portions of the electrical contacts.

20. The method of claim 18 wherein successively applying a defined voltage between each respective pair of adjacent ones of the electrical contacts includes:
closing each of a plurality of switches to short each of the electrical contacts; and
opening each of the switches, one at a time, in succession.

21. The method of claim 18 wherein determining whether a short exists based on the defined voltages and the resulting currents includes:
determining whether the magnitude of the resulting current is within an acceptable resulting current range for the defined voltage.

22. The method of claim 18 wherein determining whether a short exists based on the defined voltages and the resulting currents includes:
determining a resistance based on the magnitude of the resulting current and the magnitude of the defined voltage; and
determining whether the determined resistance is within an acceptable resistance range for the defined voltage.

23. A system for testing fuel cell stacks, comprising:
a current source operable to produce a defined current;
a contact head having plurality of pairs of electrical contacts for contacting a plurality of fuel cells in a fuel cell stack;
means for applying a defined current to through successive ones of the pairs of electrical contacts while grounding at least some of the others ones of the pairs of electrical contacts;
at least one voltage sensor to measure a resulting voltage across adjacent ones of the pairs of electrical contacts; and
a processor coupled to receive signals corresponding to at least one of a magnitude of the defined current and a magnitude the resulting voltage, the processor configured to determine whether a short exists in at least one of the fuel cells based on the magnitude of the defined current and the magnitude of the resulting voltage.

24. The fuel cell resistance test system of claim 23 wherein the processor is configured to determine whether a short exists based on the magnitude of the defined current and the magnitude of the resulting voltage, by:
determining whether the magnitude of the resulting voltage is within an acceptable resulting voltage range for the defined current.

25. The fuel cell resistance test system of claim 23 wherein the processor is configured to determine whether a short exists based on the magnitude of the defined current and the magnitude of the resulting voltage, by:
determining a resistance based on the magnitude of the defined current and the magnitude of the resulting voltage; and
determining whether the determined resistance is within an acceptable resistance range for the defined current.

26. The fuel cell resistance test system of claim 23, further comprising a carriage selectively positionable between a first position where all of the electrical contacts are in physical contact with respective portions of a fuel cell stack to be tested and a second position spaced from the first position.

27. The fuel cell resistance test system of claim 23, further comprising a start switch selectively operable to operate the defined current applying means.

28. The fuel cell resistance test system of claim 23, further comprising a first connector coupled to the current supply; and a second connector coupled to the electrical contacts, the first and the second connectors sized and shaped to matingly couple with one another to provide a selectively connectable electrical connection between the current supply and the electrical contacts.

29. The fuel cell resistance test system of claim 23 wherein at least a portion of each of the electrical contacts form a coplanar array.

30. The fuel cell resistance test system of claim 23, further comprising:

at least one pass/fail indicator coupled to the processor for selective activation in response to.

31. The fuel cell resistance test system of claim 23 wherein the electrical contacts take the form of spring loaded probes, extending at least partially from the test head.

32. The fuel cell resistance test system of claim 23, further comprising a tray sized and dimensioned for receiving fuel cell stacks;

a linear guide; and a carriage sized and dimensioned for receiving the tray, the carriage received on the linear guide for movement therealong between a first position where each of the electrical contacts are in physical contact with a respective portion of a fuel cell stack carried on the tray and a second position spaced from the first position.

33. The fuel cell resistance test system of claim 23 wherein the current source produces the defined current such that the resulting voltage is approximately 100 mV for testing membrane electrode assemblies having catalysts including ruthenium.

34. The fuel cell resistance test system of claim 23 wherein the current source produces the defined current such that the resulting voltage is approximately 200 mV for testing membrane electrode assemblies having catalysts not including ruthenium.

35. The fuel cell resistance test system of claim 23 wherein the current source produces the defined current such that the resulting voltage is between approximately 100 mV and 300 mV for testing membrane electrode assemblies having catalysts including ruthenium.

36. The fuel cell resistance test system of claim 23 wherein the current source produces the defined current such that the resulting voltage is between approximately 200 mV and 400 mV for testing membrane electrode assemblies having catalysts not including ruthenium.

37. A method of testing fuel cell stacks, comprising:

simultaneously coupling a plurality of spaced pairs of electrical contacts to respective portions of a fuel cell stack;

successively applying a defined current through each respective pair of the electrical contacts;

measuring a respective voltage across resulting from each of the applied defined voltages across adjacent ones of the pairs of electrical contacts before reaching a steady state condition; and determining whether a short exists in at least one of the fuel cells based on the defined currents and the resulting voltages.

38. The method of claim 37 wherein at least a portion of each of the electrical contacts are co-planar and simultaneously coupling a plurality of spaced electrical contacts to respective portions of a fuel cell stack includes moving the fuel cell stack along a linear guide toward a plane defined by the co-planar portions of the electrical contacts.

39. The method of claim 37 wherein determining whether a short exists based on the defined voltages and the resulting currents includes:

determining whether the magnitude of the resulting voltage is within an acceptable resulting voltage range for the defined current.

40. The method of claim 37 wherein determining whether a short exists based on the defined currents and the resulting voltages includes:

determining a resistance based on the magnitude of the defined current and the magnitude of the resulting voltage and;

determining whether the determined resistance is within an acceptable resistance range for the defined current.

* * * * *

UNITED STATES PATENT AND TRADEMARK OFFICE
CERTIFICATE OF CORRECTION

PATENT NO. : 6,798,221 B2
DATED : September 28, 2004
INVENTOR(S) : Zhaoyu Wang et al.

It is certified that error appears in the above-identified patent and that said Letters Patent is hereby corrected as shown below:

Column 13,
Line 11, "soiree" should read as -- source --.

Column 15,
Line 1, "carnage" should read as -- carriage --.

Signed and Sealed this

Thirtieth Day of August, 2005

JON W. DUDAS
*Director of the United States Patent and Trademark Office*